United States Patent
Hattori et al.

(10) Patent No.: US 6,409,984 B1
(45) Date of Patent: Jun. 25, 2002

(54) SPINEL-TYPE LITHIUM MANGANESE COMPLEX OXIDE FOR A CATHODE ACTIVE MATERIAL OF A LITHIUM SECONDARY BATTERY

(75) Inventors: Koji Hattori; Yasuhisa Yamashita, both of Shiga-ken (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 08/877,260

(22) Filed: Jun. 17, 1997

(30) Foreign Application Priority Data

| Jun. 17, 1996 | (JP) | 8-155677 |
| Aug. 29, 1996 | (JP) | 8-228794 |
| Dec. 3, 1996 | (JP) | 8-322967 |
| Apr. 9, 1997 | (JP) | 9-090805 |

(51) Int. Cl.$^7$ ................. C01D 15/00; C01G 45/00; H01M 4/50
(52) U.S. Cl. ................. 423/599; 429/224
(58) Field of Search ................. 423/599; 429/224

(56) References Cited

U.S. PATENT DOCUMENTS

| 4,567,031 | A |   | 1/1986  | Riley            |         |
|-----------|---|---|---------|------------------|---------|
| 5,081,102 | A |   | 1/1992  | Gay et al.       |         |
| 5,110,696 | A |   | 5/1992  | Shokoohi et al.  |         |
| 5,122,505 | A |   | 6/1992  | Gusman et al.    |         |
| 5,177,055 | A |   | 1/1993  | Kinsman et al.   |         |
| 5,264,201 | A |   | 11/1993 | Dahn et al.      |         |
| 5,370,948 | A |   | 12/1994 | Hasegawa et al.  |         |
| 5,449,577 | A | * | 9/1995  | Dahn et al.      | 423/599 |
| 5,490,320 | A |   | 2/1996  | Hasegawa et al.  |         |
| 5,496,664 | A | * | 3/1996  | Sterr            | 429/224 |
| 5,565,688 | A |   | 10/1996 | Hayashi          |         |
| 5,589,300 | A | * | 12/1996 | Fauteux et al.   | 429/224 |
| 5,599,642 | A |   | 2/1997  | Toshiro et al.   |         |
| 5,626,635 | A |   | 5/1997  | Yamaura et al.   |         |
| 5,629,110 | A |   | 5/1997  | Kobayashi et al. |         |
| 5,648,057 | A |   | 7/1997  | Ueda et al.      |         |
| 5,700,442 | A | * | 12/1997 | Bloch et al.     | 423/599 |
| 5,700,597 | A | * | 12/1997 | Zhong et al.     | 429/224 |
| 5,702,679 | A | * | 12/1997 | Sheargold et al. | 423/599 |
| 5,702,845 | A |   | 12/1997 | Kawakami et al.  |         |
| 5,705,296 | A |   | 1/1998  | Kamauchi et al.  |         |
| 5,718,877 | A | * | 2/1998  | Manev et al.     | 423/599 |
| 5,742,070 | A | * | 4/1998  | Hayashi et al.   | 423/599 |
| 5,770,018 | A | * | 6/1998  | Saidi            | 423/599 |
| 5,789,115 | A |   | 8/1998  | Manev et al.     |         |
| 5,792,442 | A | * | 8/1998  | Manev et al.     | 423/599 |
| 5,807,646 | A | * | 9/1998  | Iwata et al.     | 423/599 |
| 5,958,362 | A | * | 9/1999  | Takatori et al.  | 423/599 |

FOREIGN PATENT DOCUMENTS

| EP | 0582448 A1 | 2/1994 |
| EP | 0709906 A1 | 5/1996 |
| EP | 0820113 A1 | 1/1998 |
| JP | 06333562   | 12/1994 |
| JP | 07006764   | 10/1995 |
| JP | 08069790   | 3/1996 |
| JP | 08321300   | 3/1996 |
| WO | WO94/25398 | 11/1994 |

OTHER PUBLICATIONS

V. Manev, et al., "Synthesis of LiMn$_2$O$_4$ For Rechargeable Lithium–Ion Battery," Central Laboratory of Electrochemical Power Sources, Bulgarian Academy of Sciences (Jan. 1, 1995), XP 000590058.

"Preparation of Spherical LiCoO$_2$ Powders by the Ultrasonic Spray Decomposition and Its Application to Cathode Active Material in Lithium Secondary Battery"; Takashi Ogihara, et al.; *Journal of the Ceramic Society of Japan*; International Edition; 101 (1993) Oct. No. 10; pp. 1128–1132.

"Electrochemistry and Structural Chemistry of LiNiO$_2$ (R3) for 4 Volt Secondary Lithium Cells"; Tsutomu Ohzuku, et al.; *J. Electrochem. Soc.*; vol. 140, No. 7, Jul. 1993; pp. 1862–1870.

\* cited by examiner

*Primary Examiner*—Steven Bos
(74) *Attorney, Agent, or Firm*—Dickstein, Shapiro, Morin & Ostrolenk, LLP.

(57) ABSTRACT

The invention provides a spinel-type lithium manganese complex oxide for use as a cathode active material of a lithium secondary battery, which is characterized in that said spinel-type lithium manganese complex oxide has an average particle diameter between about 1 and 5 micrometers and a specific surface area between about 2 and 10 m$^2$/g. The invention also provides a process for producing the spinel-type lithium manganese complex oxide comprises the steps of l)atomizing and pyrolyzing an aqueous or alcohol solution of compounds containing metallic salts constituting a spinel-type lithium manganese complex oxide to obtain said complex oxide, and 2) annealing said spinel-type lithium manganese complex oxide to increase the average particle diameter thereof to between about 1 and 5 micrometers and adjust the specific surface area thereof to between about 2 and 10 m$^2$/g. The spinel-type lithium manganese complex oxide exhibits a large charge-discharge capacity and excellent charge-discharge cycle characteristics, and it can be used in a 4-V region secondary battery.

12 Claims, 1 Drawing Sheet

SPINEL-TYPE LITHIUM MANGANESE COMPLEX OXIDE FOR A CATHODE ACTIVE MATERIAL OF A LITHIUM SECONDARY BATTERY

BACKGROUND OF THE INVENTION

The present invention relates to a spinel-type lithium manganese complex oxide for use as a cathode active material of a lithium secondary battery and a process for producing it. The spinel-type lithium manganese complex oxide is useful as a cathode active material of, for instance, a 4-V lithium secondary battery.

Prior Art

As a method of producing a spinel-type lithium manganese complex oxide which is used as a cathode active material of a lithium secondary battery, the following methods have been proposed so far.

(a) A powder method in which lithium carbonate and manganese dioxide powders are mixed with each other, and the mixture is calcined at approximately 800° C.

(b) A melt-impregnation method. Lithium nitrate or lithium hydroxide which is easy to melt below 500° C. is penetrated into porous manganese dioxide, and calcined.

(c) A method in which lithium nitrate and manganese nitrate are dissolved in water, and the solution is ultrasonically spray-pyrolyzed.

As a lithium manganese complex oxide which is appropriate as a cathode active material of a lithium secondary battery, the following complex oxides have been proposed.

(d) $LiMn_2O_4$ (Japanese Patent Publication No. 21,431/1996)

(e) $Li_xMn_2O_4$ in which x is $0.9 \leq x \leq 1.1$ excluding x=1.0 (Japanese Patent Publication No. 21,382/1996)

(f) $Li_2Mn_4O_9$, $Li_4Mn_5O_{12}$ [J. Electrochem Soc., vol. 139, No. 2, pp. 363–366 (1992)]

(g) $Li_xMn_2O_y$ in which x and y are $1.0<x<1.6$, $4.0<y<4.8$, and $8/3+(4/3)$ $x<y<4.0+(1/2)x$ [Japanese Laid-Open (Kokai) No. 2,921/1996]

(h) $Li_{1+x}Mn_{2-x}O_4$ in which x is 0, 0.03, 0.05, 0.10, 0.22, 0.29 or 0.33 [Solid State Ionics 69 (1994), pp. 59–67]

The above-mentioned methods have, however, involved the following problems.

In the powder method (a), carbonate and oxide powders are used as starting materials and it is, therefore, necessary to be calcined the same at a relatively high temperature. Accordingly, a defective spinel such as an excess oxygen spinel tends to be formed. Further, it is impossible to uniformly mix the powders at a molecular level. For example, not only intended $LiMn_2O_4$ but also $Li_2MnO_3$ and $LiMnO_2$ are sometimes formed. In order to prevent formation of such complex oxides, calcination for a long period of time has to be repeated several times while adjusting the content of oxygen.

The melt-impregnation method (b) improves the uniformity of Li and Mn in comparison with the solid phase method. However, a porous manganese material is required as a starting material. In order to obtain this porous manganese material, a milling treatment is needed. For this milling treatment, a special mill has to be used, and impurities from grinding media and mill lining are inevitable. These impurities decrease the qualities of the resulting complex oxide powder as a cathode active material and increase the cost. Further, unless the calcination is conducted for a long period of time at a low temperature to avoid vaporization of the lithium starting material whose melting point is low, the crystallinity of the resulting complex oxide is decreased. Accordingly, when the complex oxide is used as an active material of a secondary battery, the crystal structure collapses during repetition of the charge-discharge cycle of the battery, decreasing the capacity of the secondary battery. Still further, when Mn is substituted by a cation having a low valence and an ionic radius close to that of Mn, such as Fe, Co, Ni or Mg, to improve the high-rate discharge or the charge-discharge cycle characteristics of the secondary battery, it is unescapable that the distribution of Mn and the substituent cation is non-uniform in this melt-impregnation method.

In the spray pyrolysis method (c), the salts constituting the spinel-type lithium manganese complex oxide can uniformly be mixed at the ionic level to outstandingly increase the uniformity as compared to the melt-impregnation method. Further, since the step of milling the starting materials is not needed, impurities formed during the milling step can be prevented. However, in this spray pyrolysis method, the period of thermal treatment is too short because a series of steps of evaporation of the solvent and thermal-decomposition are conducted within a few seconds. The conventional calcination treatment and the crystallinity of the resulting complex oxide is not good. Accordingly, when the complex oxide is used as an active material of a secondary battery, the crystal structure collapses during repetition of the charge-discharge cycle of the battery to decrease the capacity of the secondary battery. Further, since the specific surface area of the resulting complex oxide is as large as tens of square meters per gram, an electrolyte in contact with this complex oxide becomes decomposed, sometimes notably decreasing the charge-discharge cycle characteristics and the storage properties of the secondary battery.

Still further, the compositions of the above-mentioned lithium manganese complex oxides are problematic in the following points.

When the composition (d) is used as a cathode active material of a secondary battery, the capacity of the battery is decreased to 50% of the original capacity in a matter of tens of charge-discharge cycles.

When the composition (e) is used as a cathode active material of a secondary battery and x is $0.9 \leq x \leq 1.0$, the amount of the lithium ion taken out by the initial charge decreases causing a decrease of the capacity of the battery. When x is $1.0<x \leq 1.1$, the crystal structure is changed from a cubic system of a 4-V region to a tetragonal system of a 3-V region through Jahn-Teller phase transition causing decrease of the capacity of the battery in the repetition of the charge-discharge cycle.

The composition (f) has an operating potential in the approximately 3.0 V region, and therefore cannot be used as a cathode active material of a 4-V region lithium battery.

The composition (g) includes a composition close to the composition (f) of the 3-V region. In order to form these active materials, a manganese starting material having a specific surface area of from 5 to 50 m²/g is needed. However, a powder having a large specific surface area has a strong cohesive force and cannot uniformly be mixed with the lithium starting material. It is further necessary that after the manganese and lithium starting materials are mixed, the mixture is calcined at 500° C. or less for 2 hours or more and then at 850° C. or less for from 1 to 50 hours. As a result, the productivity is poor.

In the composition (h), a part of a manganese site is substituted with lithium to control the Jahn-Teller phase transition and improve the cycle characteristics. Nevertheless, the mere substitution of manganese with 3.0% lithium decreases the discharge capacity of approximately 20%.

SUMMARY OF THE INVENTION

Accordingly, it is an object of the present invention to solve the above-mentioned problems, and provide a spinel-type lithium manganese complex oxide for a cathode active material of a lithium secondary battery and a process for producing it. The spinel-type lithium manganese complex oxide can be used as a cathode active material of a 4-V region lithium secondary battery having a large charge-discharge capacity and exhibiting excellent charge-discharge cycle characteristics.

The present invention provides a spinel-type lithium manganese complex oxide for a cathode active material of a lithium secondary battery, which is characterized in that said spinel-type lithium manganese complex oxide has an average particle diameter between about 1 and 5 micrometers, and a specific surface area between about 2 and 10 m²/g.

In the above spinel-type lithium manganese complex oxide, said spinel-type lithium manganese complex oxide may be represented by the formula $Li(Mn_{2-x}Li_x)O_4$ wherein x is $0 \leq x \leq 0.1$ and more preferably, x is $0 < x < 0.02$. In the above spinel-type lithium manganese complex oxide, preferably Mn is partially substituted by Cr, Ni, Fe, Co, Mg or Li.

This described composite complex oxide solves the above mentioned problem having a high surface activity which is appropriate as a cathode active material of a lithium secondary battery.

The present invention further provides a process for producing the spinel-type lithium manganese complex oxide comprises the steps of: 1) atomizing and pyrolyzing an aqueous solution and/or an alcohol solution of compounds containing metallic salts constituting a spinel-type lithium manganese complex oxide to obtain said complex oxide, and 2) annealing said spinel-type lithium manganese complex oxide to increase the average particle diameter thereof to about between about 1 and 5 micrometers and adjust the specific surface area thereof to between about 2 and 10 m²/g.

In the above process, the atomizing and pyrolyzing temperature may be between about 500 and 900° C., and the annealing temperature may be between about 600 and 850° C.

In the above process, the metallic salts may be at least one of lithium nitrate, lithium acetate and lithium formate and at least one of manganese nitrate, manganese acetate and manganese formate.

When the aqueous solution and/or the alcohol solution containing the metallic salts constituting the spinel-type lithium manganese complex oxide is atomized into a heated atmosphere, heat decomposition occurs instantaneously to cause fine droplets due to a self-chemical decomposition. Consequently, a fine complex oxide having the high surface activity can be formed. When this complex oxide is then annealed, the average particle diameter is increased to between about 1 and 5 micrometers, and the specific surface area is adjusted to between about 2 and 10 m²/g. Thus, the composite complex with the high surface activity which is appropriate as a cathode active material of a lithium secondary battery can be obtained.

The metallic salts constituting the spinel-type lithium manganese complex oxide are of Li and Mn as well as substituents for improving charge/discharge characteristics (such as Cr, Ni, Fe, Co, Mg and Li) added as required for substitution of the Mn site. In this connection, Li as a substituent of the Mn site (octahedral site) is different from Li in the tetrahedral site. Typical examples of the water-soluble compounds comprising these metal salts include acetate, formate, nitrate and chloride. These compounds are much less costly than an organic complex in which a hydrogen ion in the molecule is substituted with a metallic ion, such as an alkoxide. With these compounds, the cost of starting materials can be reduced, and this is industrially advantageous.

Thus, the process of the present invention can provide a uniform spinel-type lithium manganese complex oxide having an average particle diameter of between about 1 and 5 μm and a specific surface area of between about 2 and 10 m²/g.

Accordingly, when this complex oxide, preferably the complex oxide represented by the formula $Li(Mn_{2-x}Li_x)O_4$ in which x is $0 \leq x \leq 0.1$, more preferably the complex oxide in which x is $0 < x < 0.02$, is used as a cathode active material of a secondary battery, a lithium secondary battery which is excellent in the charge-discharge cycle characteristics and the storage characteristics can be obtained.

The present invention is illustrated specifically by referring to the following embodiments.

DETAILED DESCRIPTION OF THE INVENTION

Figure 1:
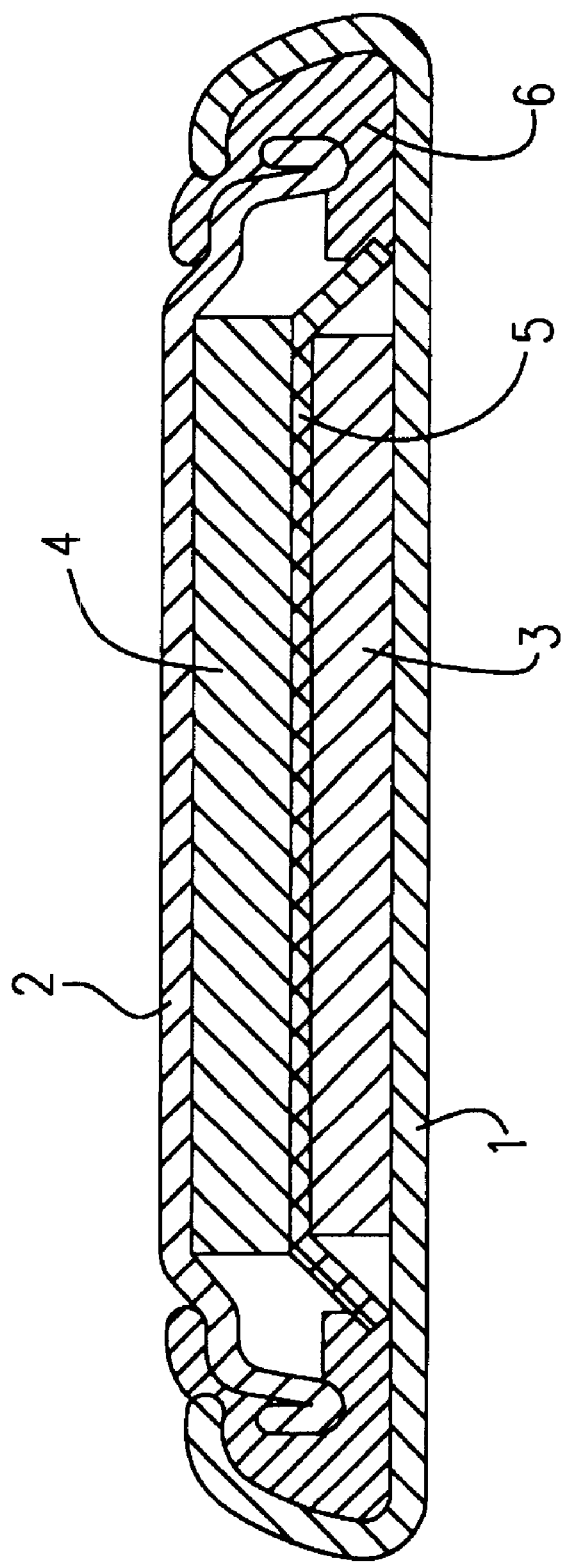
FIG. 1 is a sectional view illustrating an example of a lithium secondary battery.

First, lithium nitrate, lithium acetate, lithium formate, manganese nitrate, manganese acetate and manganese formate were prepared as compounds of metallic salts for a lithium manganese complex oxide. In order to obtain a lithium manganese complex oxide represented by the formula $Li(Mn_{2-x}Li_x)O_4$ (in which $0 \leq x \leq 0.1$) shown in Table 1, these compounds were then accurately weighed, and charged into a container. Then, 1,000 ml of a mixed solution of water and alcohol (volume ratio of 1:1) were added thereto, and the compounds were dissolved therein while being stirred.

Subsequently, this mixed solution was atomized and pyrolyzed at a rate of 1,200 ml/hr from a nozzle to a vertical-type ceramic tube reactor adjusted to a predetermined temperature of from 400 to 900° C. to obtain a powder of a complex oxide. The resulting complex oxide was then charged into an alumina sagger, and annealed at a predetermined temperature of from 500 to 900° C. for 2 hours. In this manner, the lithium manganese complex oxides shown as Sample Nos. 1 to 26 in Table 1 were obtained. Note that the lithium manganese complex oxides of Sample Nos. 14 and 18 marked with asterisk are not compounds for the invention.

A lithium manganese complex oxide of the formula $LiMn_2O_4$ shown in Sample No. 27 in Table 1 was obtained by a melt-impregnation method for comparison. That is, lithium nitrate and electrolytic manganese dioxide were first prepared as starting materials. Then, 1 mol of lithium nitrate and 2 mols of electrolytic manganese dioxide were accurately weighed, and milled and mixed using a ball mill. The mixture was then calcined at 700° C. for 2 hours to obtain the complex oxide.

TABLE 1

| Sample No. | Starting materials lithium | Starting materials manganese | $Li(Mn_{2-x}Li_x)O_4$ where x is | Atomizing temperature | Annealing temperature |
|---|---|---|---|---|---|
| 1 | lithium nitrate | manganese nitrate | 0 | 400 | 800 |
| 2 | lithium nitrate | manganese nitrate | 0 | 500 | 800 |
| 3 | lithium nitrate | manganese nitrate | 0 | 850 | 800 |
| 4 | lithium nitrate | manganese nitrate | 0 | 750 | 800 |
| 5 | lithium nitrate | manganese nitrate | 0.002 | 750 | 800 |
| 6 | lithium nitrate | manganese nitrate | 0.005 | 750 | 800 |
| 7 | lithium nitrate | manganese nitrate | 0.01 | 750 | 800 |
| 8 | lithium nitrate | manganese nitrate | 0.015 | 750 | 800 |
| 9 | lithium nitrate | manganese nitrate | 0.018 | 750 | 800 |
| 10 | lithium nitrate | manganese nitrate | 0.030 | 750 | 800 |
| 11 | lithium nitrate | manganese nitrate | 0.060 | 750 | 800 |
| 12 | lithium nitrate | manganese nitrate | 0.100 | 750 | 800 |
| 13 | lithium nitrate | manganese nitrate | 0 | 900 | 800 |
| *14 | lithium nitrate | manganese nitrate | 0 | 700 | 500 |
| 15 | lithium nitrate | manganese nitrate | 0 | 700 | 600 |
| 16 | lithium nitrate | manganese nitrate | 0 | 700 | 800 |
| 17 | lithium nitrate | manganese nitrate | 0 | 700 | 850 |
| *18 | lithium nitrate | manganese nitrate | 0 | 700 | 900 |
| 19 | lithium acetate | manganese acetate | 0 | 700 | 800 |
| 20 | lithium formate | manganese formate | 0 | 700 | 800 |
| 21 | lithium nitrate | manganese formate | 0 | 500 | 800 |
| 22 | lithium nitrate | manganese formate | 0 | 850 | 800 |
| 23 | lithium nitrate | manganese formate | 0 | 900 | 800 |
| 24 | lithium nitrate | manganese formate | 0 | 700 | 600 |
| 25 | lithium nitrate | manganese formate | 0 | 700 | 800 |
| 26 | lithium nitrate | manganese formate | 0 | 700 | 850 |
| *27 | lithium nitrate | electrolytic manganese dioxide | 0 | 700 (Melt-impregnation method) | |

Photographs of the above-obtained complex oxide powders were taken by means of a scanning electron microscope (SEM) to measure the particle diameters thereof. Further, the specific surface areas of the complex oxides were measured by a nitrogen adsorption method. Still further, the identification of the complex oxides was conducted by an X-ray diffraction (XRD) analysis. The results are shown in Table 2. In Table 2, LM is short for spinel-type lithium manganese complex oxide, and MO is short for $Mn_2O_3$.

TABLE 2

| Sample No. | Average particle diameter (micrometer) | Specific surface area ($m^2/g$) | XRD analysis Phase |
|---|---|---|---|
| 1 | 1.8 | 2.1 | LM, MO |
| 2 | 1.7 | 2.7 | LM |
| 3 | 1.9 | 3.0 | LM |
| 4 | 2.4 | 3.5 | LM |
| 5 | 2.4 | 3.6 | LM |
| 6 | 2.3 | 3.6 | LM |
| 7 | 2.3 | 3.7 | LM |
| 8 | 2.2 | 3.6 | LM |
| 9 | 2.3 | 3.7 | LM |
| 10 | 2.5 | 3.6 | LM |
| 11 | 2.3 | 3.6 | LM |
| 12 | 2.7 | 3.0 | LM |
| 13 | 2.4 | 2.3 | LM |
| *14 | 0.8 | 14.8 | LM |
| 15 | 1.6 | 8.4 | LM |

TABLE 2-continued

| Sample No. | Average particle diameter (micrometer) | Specific surface area ($m^2/g$) | XRD analysis Phase |
|---|---|---|---|
| 16 | 2.1 | 3.3 | LM |
| 17 | 1.9 | 2.5 | LM |
| *18 | 5.5 | 0.5 | LM |
| 19 | 1.4 | 2.9 | LM |
| 20 | 2.1 | 2.8 | LM |
| 21 | 1.4 | 3.4 | LM |
| 22 | 1.9 | 3.5 | LM |

TABLE 2-continued

| Sample No. | Average particle diameter (micrometer) | Specific surface area (m²/g) | XRD analysis Phase |
|---|---|---|---|
| 23 | 2.4 | 2.3 | LM |
| 24 | 1.8 | 4.6 | LM |
| 25 | 2.1 | 3.6 | LM |
| 26 | 1.9 | 2.6 | LM |
| *27 | 3.4 | 1.8 | LM |

Secondary batteries were prepared using the above-mentioned complex oxides as cathode active materials.

That is, the powder of each above complex oxide, acetylene black as an electroconductive agent and polytetrafluoroethylene as a binder were kneaded, and the mixture was formed into a sheet. This sheet was pressed on an SUS mesh to obtain a cathode.

Subsequently, as shown in FIG. 1, the above-mentioned cathode 3 and lithium metal as an anode 4 were overlaid through a polypropylene separator 5 with the SUS mesh side of the cathode 3 outside, and the product was stored in a stainless steel cathode can 1 with the cathode 3 down. The separator 5 was immersed with an electrolyte which was a solution of lithium perchlorate in a mixed solvent of propylene carbonate and 1,1-dimethoxyethane. Thereafter, the opening of cathode can 1 was sealed with a stainless steel negative electrode 2 through an insulation packing to complete a lithium secondary battery.

Then, the resulting lithium secondary battery was subjected to a charge-discharge test of 100 cycles under such conditions that the charge-discharge current density was 0.5 mA/cm², the charge limit voltage was 4.3 V and the discharge cut-off voltage was 3.0 V. The secondary battery after the completion of the charge-discharge cycle test was overhauled, and the condition (presence or absence of peeling-off) of the cathode was visually observed. The results are shown in Table 3.

TABLE 3

| Sample No. | Discharge capacity Initial | Discharge capacity After 100 cycles | Peeling-off of cathode |
|---|---|---|---|
| 1 | 86 | 65 | No |
| 2 | 128 | 126 | No |
| 3 | 130 | 127 | No |
| 4 | 133 | 122 | No |
| 5 | 131 | 124 | No |
| 6 | 130 | 126 | No |
| 7 | 130 | 128 | No |
| 8 | 129 | 126 | No |
| 9 | 128 | 125 | No |
| 10 | 122 | 118 | No |
| 11 | 115 | 112 | No |
| 12 | 96 | 95 | No |
| 13 | 136 | 132 | No |
| *14 | 133 | 113 | Yes |
| 15 | 138 | 136 | No |
| 16 | 140 | 136 | No |
| 17 | 136 | 135 | No |
| *18 | 102 | 98 | No |
| 19 | 128 | 125 | No |
| 20 | 129 | 125 | No |
| 21 | 127 | 125 | No |

TABLE 3-continued

| Sample No. | Discharge capacity Initial | Discharge capacity After 100 cycles | Peeling-off of cathode |
|---|---|---|---|
| 22 | 129 | 126 | No |
| 23 | 135 | 131 | No |
| 24 | 137 | 135 | No |
| 25 | 139 | 135 | No |
| 26 | 135 | 134 | No |
| *27 | 115 | 103 | No |

From the results in Tables 1 and 2, it is found that when the solution of the metallic salts constituting the lithium manganese complex oxide are atomized and pyrolyzed and then annealed, a composite oxide is obtained in which the average particle diameter is increased to between about 1 and 5 μm and the specific surface area is adjusted to between about 2 and 10 m²/g. Further, this complex oxide is a spinel-type lithium manganese complex oxide. When this complex oxide is used as a cathode material, a lithium secondary battery is obtained which is excellent in the initial capacity and the charge-discharge cycle characteristics and which is free from peeling-off of the battery. The spinel-type lithium manganese complex oxide which has an average particle diameter between about 1.4–3.4 micrometers and a specific surface area between about 2.1–8.4 m²/g is relatively excellent in initial capacity and charge-discharge cycle characteristics.

The specific pyrolyzing temperature is preferably between about 500 and 900° C. When it is higher than 500° C., a single phase of a spinel-type lithium manganese complex oxide is obtained. The upper limit thereof is less than the temperature at which the spinel-type lithium manganese complex oxide is pyrolyzed again. The spinel-type lithium manganese complex oxide prepared using an atomizing and pyrolyzing temperature between 700–850° C. is relatively excellent in initial capacity and charge-discharge cycle characteristics.

The specific annealing temperature is preferably between about 600 and 850° C. That is, at the annealing temperature of between about 600 and 850° C., the spinel-type lithium manganese complex oxide having the particle size appropriate as a cathode active material of a lithium secondary battery can be obtained. The spinel-type lithium manganese complex oxide prepared using an annealing temperature between 600–800° C. is relatively excellent in initial capacity and charge-discherge cycle characteristics.

By comparison of Sample Nos. 4 to 12, the effect of controlling the Jahn-Teller phase transition is seen, and the decrease in the capacity in the charge-discharge cycle is suppressed when the amount x of substitution of manganese with lithium is 0<x in the formula Li(Mn$_{2-x}$Li$_x$)O$_4$. Meanwhile, when the amount x of substitution is 0.1 or less, preferably less than 0.02, a higher initial capacity can be provided. Accordingly, x in the formula Li(Mn$_{2-x}$Li$_x$) O$_4$ is preferably 0≦x≦0.1, preferably 0<x<0.02.

In the above-mentioned Example, the metallic salt compounds constituting the complex oxide of the formula Li(Mn$_{2-x}$Li$_x$) O$_4$ were nitrates, acetates or formates. However, the present invention is not limited thereto. That is, compounds which dissolve in water or alcohol, such as chlorides, can also be used as required.

Sample No. 25 in which lithium nitrate was used as a Li salt and magnesium formate as an Mn salt exhibits a higher discharge capacity than Sample No. 19 in which lithium acetate and manganese acetate are used or Sample No. 20 in which lithium formate and manganese formate are used, and the discharge capacity of Sample No. 25 is as high as that of Sample No. 16 in which lithium nitrate and manganese nitrate are used. When using lithium nitrate and manganese formate, the reaction represented by formula (1) below occurs, and the amount of $NO_2$ formed is one-fifth that when using lithium nitrate and manganese nitrate which causes the reaction represented by formula (2). Thus, it is easier to treat a waste gas after the reaction. Accordingly, it is most preferable to use lithium nitrate and manganese formate as compounds of metallic salts constituting the complex oxide of the formula $Li(Mn_{2-x}Li_x) O_4$.

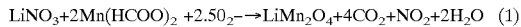

$$LiNO_3 + 2Mn(HCOO)_2 + 2.5O_2 \rightarrow LiMn_2O_4 + 4CO_2 + NO_2 + 2H_2O \quad (1)$$

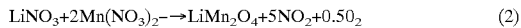

$$LiNO_3 + 2Mn(NO_3)_2 \rightarrow LiMn_2O_4 + 5NO_2 + 0.5O_2 \quad (2)$$

When the spinel-type lithium manganese complex oxide is a complex oxide obtained by substituting a part of a Mn site of $Li(Mn_{2-x}Li_x) O_4$ with Cr, Ni, Fe, Co or Mg, the same effects can also be obtained.

What is claimed is:

1. A process for producing a spinel lithium manganese complex oxide for a cathode active material of a lithium secondary battery, which comprises the steps of:
   a) atomizing and pyrolyzing a composition which consists essentially of an aqueous or alcohol solution of nitrate, acetate or formate of metal elements constituting a spinel lithium manganese complex oxide at a temperature between 500 and 900° C. to obtain a spinel lithium manganese complex oxide by atomizing said solution into a heated atmosphere, and
   b) annealing said spinel lithium manganese complex oxide at a temperature between about 600 and 850° C. for a time sufficient to increase the average particle diameter thereof to between about 1 and 5 micrometers and adjust the specific surface area thereof to between about 2 and 10 $m^2/g$.

2. The process according to claim 1, wherein said spinel lithium manganese complex oxide is represented by the formula $Li(Mn_{2-x}Li_x) O_4$ wherein x is $0 \leq x \leq 0.1$.

3. The process according to claim 2, wherein x is $0 < x < 0.02$.

4. The process according to claim 3, wherein Mn is partially replaced by Cr, Ni, Fe, Co or Mg.

5. The process according to claim 1, wherein said spinel lithium manganese complex oxide is represented by the formula $Li(Mn_{2-x}Li_x)O_4$ wherein x is $0 < x < 0.1$.

6. The process according to claim 5, wherein Mn is partially replaced by Cr, Ni, Fe, Co or Mg.

7. The process according to claim 1, characterized in that the atomizing and pyrolyzing temperature is between about 700 and 850° C.

8. The process according to claim 7, characterized in that the annealing temperature is between about 600 and 800° C.

9. The process according to claim 2, wherein Mn is partially replaced by Cr, Ni, Fe, Co or Mg.

10. The process according to claim 5, wherein x is $0 \leq x \leq 0.02$.

11. The process according to claim 10, wherein Mn is partially replaced by Cr, Ni, Fe, Co or Mg.

12. A process for producing a spinel lithium manganese complex oxide for a cathode active material of a lithium secondary battery, which comprises the steps of:
    a) atomizing and pyrolyzing a composition which consists essentially of an aqueous or alcohol solution of lithium nitrate and manganese formate at a temperature between 500 and 900° C. to obtain a spinel lithium manganese complex oxide by atomizing said solution into a heated atmosphere, and
    b) annealing said spinel lithium manganese complex oxide at a temperature between about 600 and 850° C. for a time sufficient to increase the average particle diameter thereof to between about 1 and 5 micrometers and adjust the specific surface area thereof to between about 2 and 10 $m^2/g$.

* * * * *